(12) United States Patent
Schuster et al.

(10) Patent No.: US 7,460,827 B2
(45) Date of Patent: Dec. 2, 2008

(54) RADIO FREQUENCY PROXIMITY DETECTION AND IDENTIFICATION SYSTEM AND METHOD

(75) Inventors: Paul R. Schuster, Baltimore, MD (US); Douglas L. Lewis, Sykesville, MD (US)

(73) Assignee: Arbitron, Inc., Columbia, MD (US)

( * ) Notice: Subject to any disclaimer, the term of this patent is extended or adjusted under 35 U.S.C. 154(b) by 722 days.

(21) Appl. No.: 10/620,244

(22) Filed: Jul. 15, 2003

(65) Prior Publication Data

US 2004/0027271 A1 Feb. 12, 2004

Related U.S. Application Data

(60) Provisional application No. 60/398,694, filed on Jul. 26, 2002.

(51) Int. Cl.
*H04H 60/33* (2008.01)
*H04H 60/21* (2008.01)
*H04H 60/61* (2008.01)

(52) U.S. Cl. .................. 455/2.01; 455/66.1; 725/12
(58) Field of Classification Search .............. 455/2.01, 455/66.1, 41.2, 41.3; 725/12, 10, 14, 9
See application file for complete search history.

(56) References Cited

U.S. PATENT DOCUMENTS

| | | | | |
|---|---|---|---|---|
| 4,644,509 A | * | 2/1987 | Kiewit et al. ................. 367/87 |
| 4,695,879 A | * | 9/1987 | Weinblatt ..................... 725/10 |
| 4,718,106 A | * | 1/1988 | Weinblatt ................... 455/2.01 |
| 4,769,697 A | * | 9/1988 | Gilley et al. .................. 725/12 |
| 4,779,198 A | * | 10/1988 | Lurie ........................ 725/12 |
| 4,930,011 A | * | 5/1990 | Kiewit ....................... 725/10 |
| 5,382,970 A | * | 1/1995 | Kiefl ....................... 455/2.01 |
| 5,450,490 A | * | 9/1995 | Jensen et al. ................ 380/253 |
| 5,457,807 A | * | 10/1995 | Weinblatt .................. 455/2.01 |
| 5,483,276 A | * | 1/1996 | Brooks et al. ................ 725/10 |
| 5,561,835 A | * | 10/1996 | Worthy .................... 455/2.01 |
| 5,574,962 A | * | 11/1996 | Fardeau et al. ............. 455/2.01 |
| 5,574,963 A | * | 11/1996 | Weinblatt et al. ........... 455/2.01 |
| 5,579,124 A | * | 11/1996 | Aijala et al. ................. 386/96 |
| 5,581,800 A | * | 12/1996 | Fardeau et al. ............. 455/2.01 |

(Continued)

OTHER PUBLICATIONS

Albert Heuberger and Thomas Drischel, "Integrated RF Transmitter Based on SAW Oscillator", Fraunhofer Institute Integrierte Schaltungen IIS-A,Am Weichselgarten 3, D-91058 Erlangen, pp. 344-347.

(Continued)

*Primary Examiner*—Lewis G West
(74) *Attorney, Agent, or Firm*—Katten Muchin Rosenman LLP; Peter Zura

(57) ABSTRACT

Disclosed herein is a critical band encoding technology (CBET) system having at least one portable people meter (PPM) and a home base station and/or household hub, the CBET system containing a radio frequency (RF) proximity detection and identification system, comprising at least one RF transmitter for receiving a control signal, modulating an RF signal to a present modulation frequency upon receipt of the control signal, and wireless transmitting the modulated signal; and an RF receiver for receiving the wirelessly transmitted modulated signal, determining the modulation frequency, and transmitting the modulation frequency to a remote location, wherein the transmission power of the RF transmitter is preset to transmit the modulated data within a predetermined range.

11 Claims, 3 Drawing Sheets

U.S. PATENT DOCUMENTS

| | | | | |
|---|---|---|---|---|
| 5,594,934 | A | * | 1/1997 | Lu et al. .................. 725/18 |
| 5,764,763 | A | * | 6/1998 | Jensen et al. ............. 380/253 |
| 5,787,334 | A | * | 7/1998 | Fardeau et al. ............ 725/22 |
| 6,286,140 | B1 | * | 9/2001 | Ivanyi ..................... 725/14 |
| 6,421,445 | B1 | * | 7/2002 | Jensen et al. ............. 380/253 |
| 6,467,089 | B1 | * | 10/2002 | Aust et al. ................ 725/13 |
| 6,523,175 | B1 | * | 2/2003 | Chan ....................... 725/15 |
| 6,643,494 | B1 | * | 11/2003 | Worthy .................... 455/2.01 |
| 6,845,360 | B2 | * | 1/2005 | Jensen et al. ............. 704/500 |
| 6,871,180 | B1 | * | 3/2005 | Neuhauser et al. ....... 704/500 |
| 6,996,237 | B2 | * | 2/2006 | Jensen et al. ............. 380/252 |
| 7,316,025 | B1 | * | 1/2008 | Aijala et al. .............. 725/18 |
| 2003/0093784 | A1 | * | 5/2003 | Dimitrova et al. ........ 725/10 |
| 2003/0171833 | A1 | | 9/2003 | Crystal et al. |
| 2005/0034147 | A1 | * | 2/2005 | Best et al. ................ 725/10 |

OTHER PUBLICATIONS

R.I.Crutcher et al., "Micro-Miniature Radio Frequency Transmitter for Communication and Tracking Applications", paper for submission to: First Annual Symposium on Enabling Technologies for Law Enforcement and Security, Boston, Massachusetts, Nov. 19-21, 1996, 6 pp.

* cited by examiner

RADIO FREQUENCY PROXIMITY DETECTION AND IDENTIFICATION SYSTEM AND METHOD

CROSS-RFFERFNCE TO RFLATED APPLICATIONS

This application claims the benefit of U.S. Provisional Application No. 60/398,694, filed Jul. 26, 2002, the contents of which are incorporated herein by reference.

BACKGROUND OF THE INVENTION

1. Field of the Invention

The present invention relates generally to a radio frequency (RF) proximity detection and identification system and method, and in particular, to a radio frequency (RF) proximity detection and identification system utilizing RF modulation.

2. Description of the Related Art

The Arbitron Company (Arbitron) is a world leader in the measurement of audience participation in the listening and viewing of radio and television broadcasts. The audience participation data (data) is of critical importance to the broadcast stations and their sponsors. Currently, the data is collected through paper diaries and electronic set-top frequency detection. Both technologies are prone to errors and provide a limited amount of useable information. In addition, there has been a tremendous increase in the use of digital formats for all types of multi-media broadcasts, so that the computer is also starting to play a major role in an individual's multi-media listening and viewing experience.

Arbitron has, therefore, developed a new and innovative technology called Critical Band Encoding Technology (CBET) that encompasses all forms of audio and video broadcasts in the measurement of audience participation. This technology dramatically increases the both the accuracy of the measurement and the quantity of useable and effective data across all types of signal broadcasts. CBET is an encoding technique that Arbitron developed and that embeds identifying information (ID code) within the audio portion of a broadcast. The encoding is done prior to broadcasting, i.e. at the broadcast station, and without audible distortion to the original audio signal. An audio signal is broadcast within the actual audio signal of the program, in a manner that makes the ID code inaudible, to all locations the program is broadcast, for example, a car radio, home stereo, television, etc. This embedded audio signal or ID code is then picked up by small (pager-size) specially designed receiving stations called Portable People Meters (PPM), which capture the encoded identifying signal, and store the information along with a time stamp in memory for retrieval at a later time. A microphone contained within the PPM receives the audio signal, which contains within it the ID code.

Arbitron provides each member of a family with a Portable People Meter (PPM) that has a unique product number to monitor the listening/viewing exposure to broadcast media such as TV and radio. The family participants wear their specific PPM throughout the day, in a fashion similar to a pager. The PPM is constantly sampling the acoustic environment and listens for a unique ID code that has been embedded within a broadcast audio signal (inaudible to human hearing). An Arbitron encoder at the broadcast station generates this unique ID code. The ID code uniquely identifies the broadcast station, and when it is recorded along with the time stamp in the PPM, allows Arbitron to easily determine which program the specific family member is listening to or viewing. A base station is provided for each PPM. A PPM is placed into a base station for recharging of the PPM and downloading of the ID code and time stamp information stored in the PPM. An IR link is utilized to transmit the ID code and time stamp information from the PPM to the base station. A household hub is provided to collect via a hardwired connection, the information collected by the base stations. The information, i.e. the ID code and time stamp, is then retrieved by Arbitron. This is done by utilizing a modem connection between the hub and an Arbitron processing center. The majority of this type of media exposure is thought to occur within the home setting, but the current system cannot differentiate when a PPM is within a home setting or not, nor can it determine what percentage of the data acquired results from at home exposure. As the participant goes about their day to day activities, they become exposed to audio from a variety of sources—for example, their radio at work, in the car, or at home. Arbitron and others in this business want to know what percentage of all the data logged or collected (broadcast station ID codes and corresponding time stamps) within each individual's PPM units came from exposure within the home environment. Being able to quantify the location of data acquisition would be beneficial to Arbitron.

The CBET technology for encoding the identifying information and the PPM data acquisition technology for capturing the embedded signals are currently being tested in various pilot studies. Preliminary results indicate strong performance, however, additional information is now being requested by the sponsors regarding the location of the participant's multimedia exposure, specifically, are they in their home or not. This location data is user-specific and, therefore, cannot be encoded in the pre-broadcast signal. Other technologies have been considered in an effort to determine the participant's listening environment, but have not been found beneficial.

SUMMARY OF THE INVENTION

It is, therefore, an aspect of the present invention to provide an RF modulation detection and identification system.

In accordance with another aspect of the present invention, there is provided a method of providing an RF modulation based detection and identification system.

The foregoing aspects of the present invention are realized by a system for a critical band encoding technology (CBET) system having at least one portable people meter (PPM) and a home base station and/or household hub, the CBET system containing a radio frequency (RF) proximity detection and identification system, comprising at least one RF transmitter for receiving a control signal, modulating an RF signal to a preset modulation frequency upon receipt of the control signal, and wireless transmitting the modulated signal; and at least one RF receiver for receiving the wirelessly transmitted modulated signal, determining the modulation frequency, and transmitting the modulation frequency to a remote location. Time stamp information will be included within the data stream.

The system can be further enhanced as the transmission power of the RF transmitter is preset to transmit the modulated data within a predetermined range.

BRIEF DESCRIPTION OF THE DRAWINGS

The above and other objects, features and advantages of the present invention will become more apparent from the following detailed description when taken in conjunction with the accompanying drawings.

DESCRIPTION OF THE PRFFERRFD EMBODIMENTS

A preferred embodiment of the present invention will be described herein below with reference to the accompanying drawings. In the following description, well-known functions or constructions are not described in detail since they would obscure the invention in unnecessary detail.

The radio frequency (RF) proximity detection and identification system and method disclosed herein comprises a system and method that determines the presence of a PPM within a predefined radius and can identify the particular PPM that is present within the predetermined radius. A newly designed RF transmitter according to the present invention is installed within an existing Arbitron PPM. When the PPM containing the RF transmitter according to the present invention receives a valid broadcast station ID code, a unique RF signal is transmitted from the PPM. Installed in the home base unit is a newly designed RF receiving unit according to the present invention. The system establishes an RF link that works with the existing Arbitron PPM hardware and home base unit, and has a preset range that can accommodate most residential homes. The system identifies the unique RF signal and transmits information regarding the received RF signals to an Arbitron processing center through the hub and modem of the evolving system. This allows Arbitron to know if a PPM (and therefore a viewer) is within a home setting.

Since electromagnetic radio frequency (RF) waves propagate through walls and doors in buildings excessive atmospheric or environmental attenuation, their use for transmitting data within the buildings is common. Also, RF signals may be modulated to act as a specific identification code and utilized as an RF identification beacon. These are the two major theories upon which the present invention is based.

Figure 1:
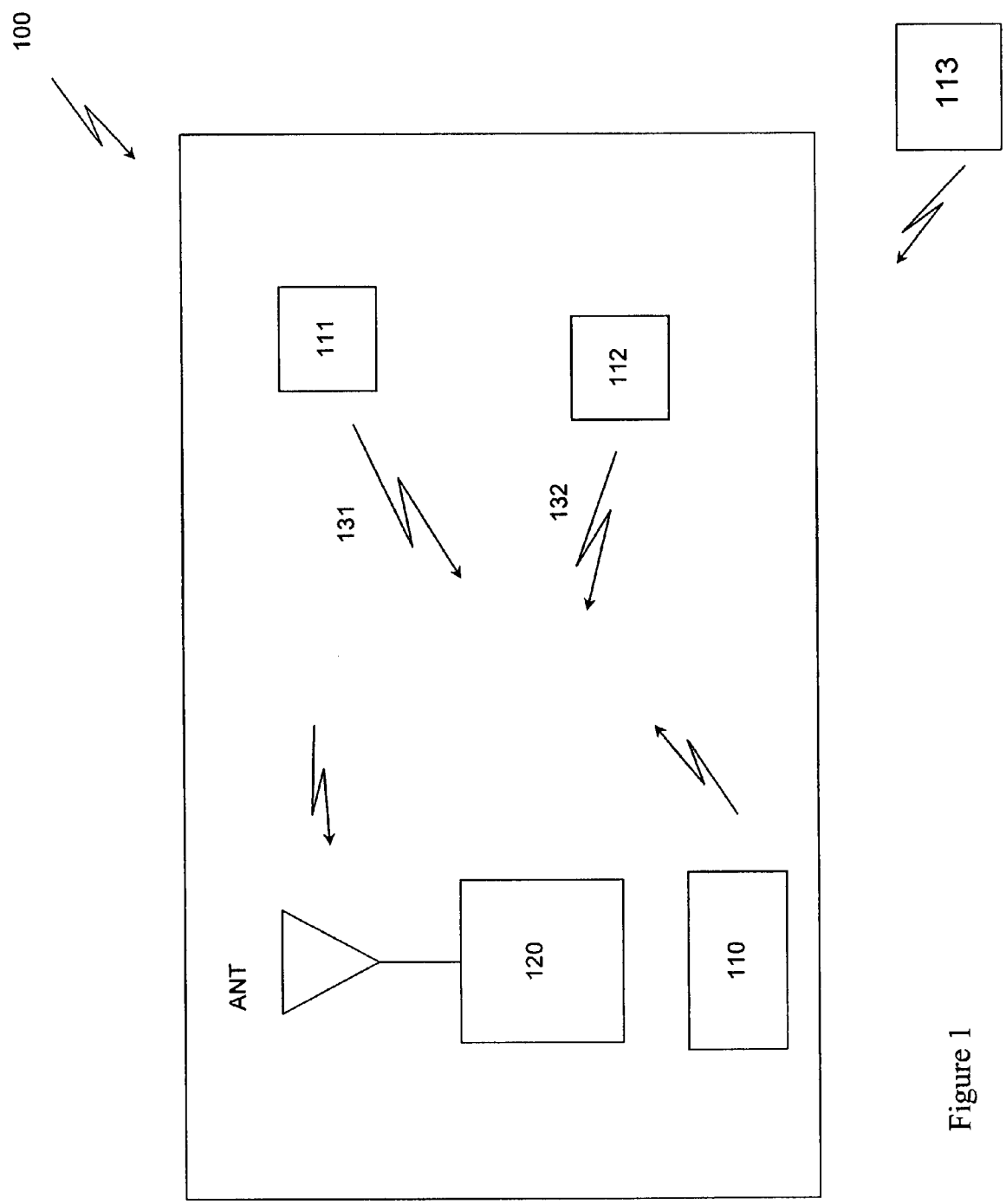
FIG. 1 is a diagram of the basic proximity detection and identification system according to an embodiment of the present invention.

FIG. 1 is a diagram of the basic proximity detection and identification system according to an embodiment of the present invention. Shown in FIG. 1 are residence 100, PPM 111, 112 and 113, each including the RF transmitter according to the present invention and for receiving an audio signal and transmitting a unique modulated RF signal, Arbitron's in-home base station, hub, or stand-alone unit 120 including the RF receiver unit according to the present invention and for receiving the unique modulated RF signals from the PPMs 111, 112, and 113. Also shown are television 110 antenna ANT, and RF links 131 and 132.

In operation, and referring to FIG. 1, television 110 transmits a unique ID code representing a particular broadcast station (ID code). This ID code is the audio code embedded at the broadcast station. In this example, each of PPM 111, 112 and 113 receive the audio ID code as in the prior art system. Each of PPM 111, 112 and 113 records the ID code along with the time stamp. PPM 113 receives the ID code even though it is outside of the viewing area of the program, which, in the prior art system would cause inaccurate viewer data as the viewer using PPM 113 is not actually within the viewing range, a major problem with the pre-existing system. Upon receipt of the ID code, PPM 111, 112 and 113 begin to transmit a uniquely modulated RF signal. The modulation frequency of each PPM is unique to the PPM and different from other PPMs in the system. The uniquely modulated RF signals are transmitted at a preset power level. Each of PPM 111, 112 and 113 would then attempt to establish an RF link with hub 120. The RF transmission power of each PPM is preset to the viewing environment, such that if a PPM leaves the viewing location, i.e. the residence, the hub 120 would no longer receive its RF signal. Therefore, even though PPM 113 receives the audio ID code and begins transmitting its uniquely modulated RF signal, the RF signal would not reach hub 120 since the transmission power level of PPM 113 is preset to reach hub 120 only at a distance within residence 100. This distance can be adjusted according to the particular viewing environments of the system. As another example, if PPM 111 is transmitting its modulated RF signal to hub 120, and PPM 111 leaves the residence, hub 120 would no longer receive the RF signal, thus alerting Arbitron that the viewer is not within the viewing environment.

The RF receiving unit according to the present invention included within hub 120 receives the uniquely modulated RF signals. Hub 120 stores the unique modulation frequency of each PPM. The modulation frequencies are then transmitted to Arbitron using its normal information exchange techniques, i.e. modem, thereby informing Arbitron of the viewers actually within the home setting.

One of the problems with small sized transmitters is the design of an antenna capable of properly transmitting an error free signal. Depending on the material of the PPM case, an antenna (not shown) could be placed inside the case itself (for example a planar antenna), extend out of the case, sit on top of the case (example: monopole spiral), or could even be incorporated into the external belt clip (possibly a bar antenna). As a result of the low duty cycle of operation, the existing rechargeable battery system within the PPM, should be able to accommodate the transmitter's or the receiver's minimal power requirements "as is".

A key design requirement for an embodiment of the present invention is that the antenna must be located in very close proximity to an electrical ground and is worn by or carried by a person. Arbitron's PPM has a plastic case that is conductive. The preferred embodiment uses inductors to significantly increase the impedance between the case and the ground reference seen by the antenna, thereby reducing the load and frequency pulling effects on the transmitter/receiver to which it is connected. An additional benefit is that the inductors used for isolation can be chosen such that the antenna is preloaded, so that pulling/loading due to close proximity to a person is diminished. Proper impedance matching can be done by considering the width and distance to ground design or by using a standard matching circuit between the receiver/transmitter and the antenna. Examples of implementation of this design would include an etched circuit board or a wire embedded in a non-conducting plastic or attached to the outside surface of a conducting case with the appropriate matching network (if required).

Figure 2:
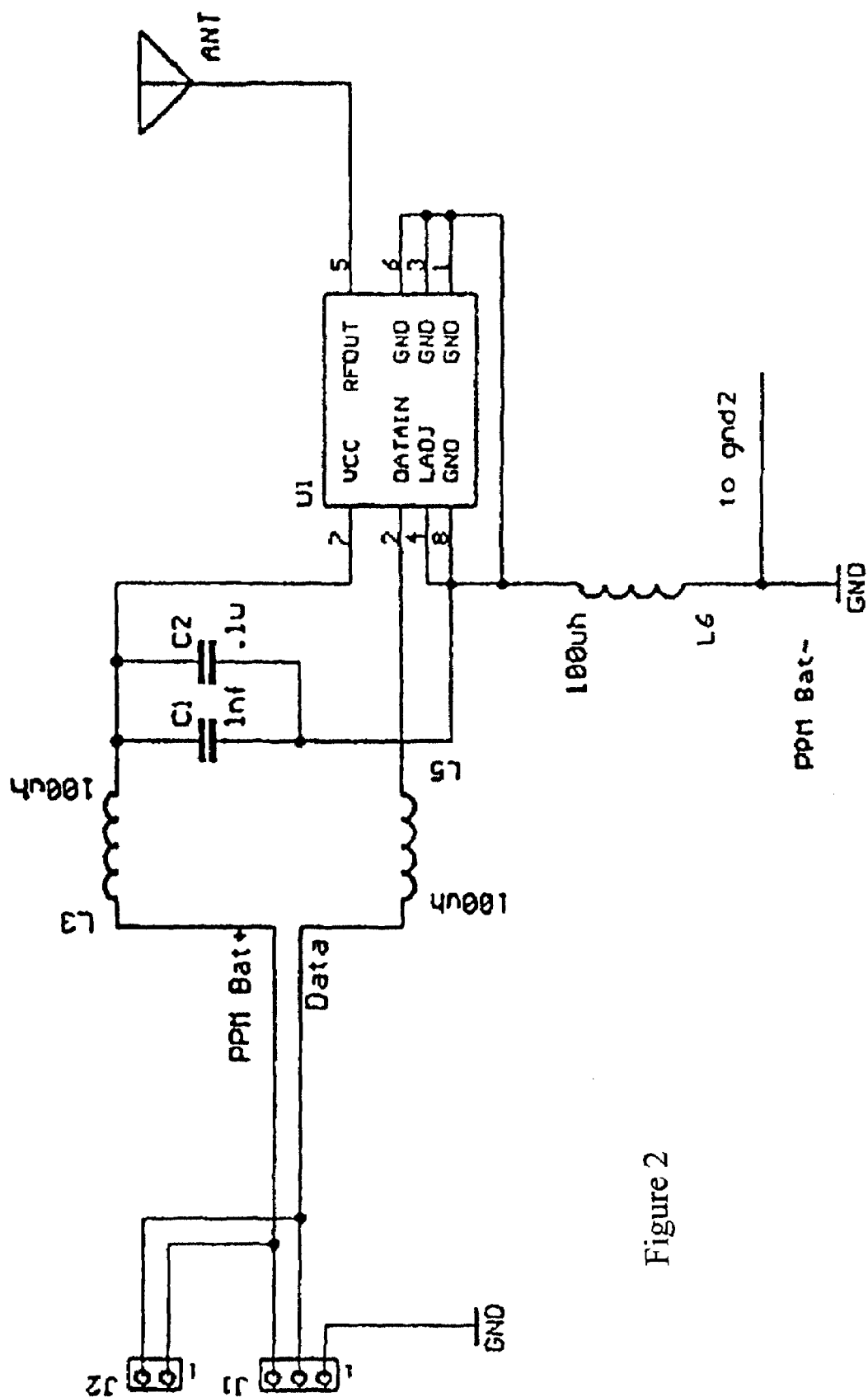
FIG. 2 is a schematic diagram of an RF transmitter circuit included in a PPM according to an embodiment of the present invention; and, FIG. 3 is a schematic diagram of an RF receiver circuit located in hub 120 according to an embodiment of the present invention.

FIG. 2 is a schematic diagram of an RF transmitter circuit included in a PPM according to an embodiment of the present invention. A Linx transmitter IC (integrated circuit) U1 was chosen strictly based on availability, Micrel and other manufactures make similar ICs that would perform equally as well, and the present invention is not limited to a particular IC. The transmitter IC incorporates an RF modulator to modulate a transmission signal to a preset modulation frequency. Referring to FIG. 2, jumpers J1 and J2 connect to an existing PPM known in the prior art, and the actual description is omitted herein as one skilled in the art can readily understand the connections. Pin 2 of IC U1 (Data In) is connected to a data source, in this case a microprocessor in the PPM. The data source informs the RF transmitter that an ID code has been recorded by the PPM and directs the RF transmitter to begin transmitting its unique RF signal. Inductors L3, L5 and L6 all perform the same function, which is, while allowing DC current to flow they isolate, with high impedance, the RF signal from the ground of the battery/case, as discussed above regarding the antenna design constraints. Capacitors C1 and C2 form a decoupling circuit to remove the RF signal from pin 7 of U1. Pin 3 of jumper J1 and pin 1 of jumper J2 connect to the positive battery terminal of the PPM. Pin 2 of jumper J1 and pin 2 of jumper J2 are connected to the data source. Pin 1 of jumper J1 is connected to the negative battery terminal of the PPM and the conductive case of the PPM. Pin 5 of IC U1 is connected to antenna ANT.

Figure 3:
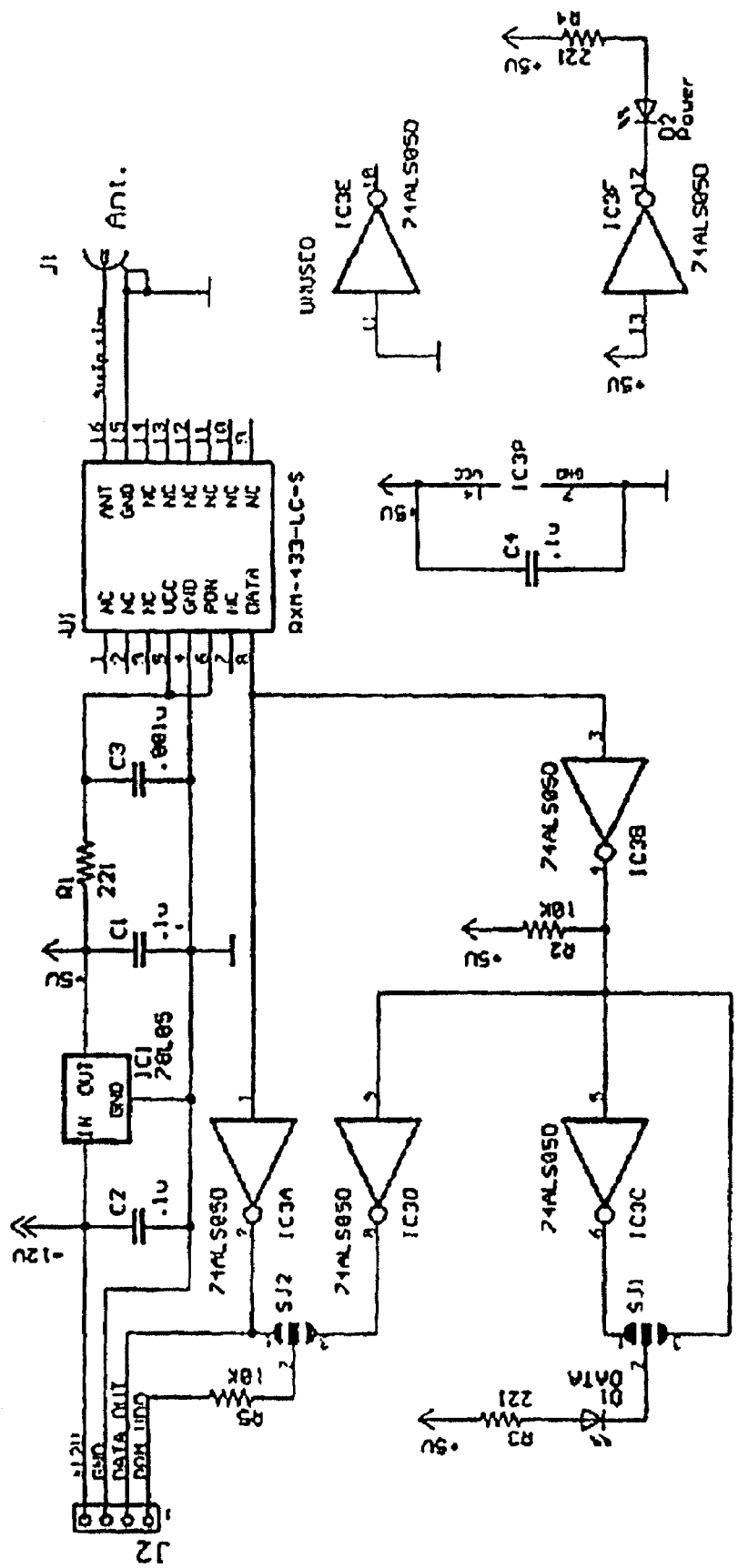

FIG. 3 is a schematic diagram of an RF receiver circuit located in a hub 120 according to an embodiment of the present invention. The Linx receiver IC was chosen strictly based on availability, Micrel and other manufactures make similar IC's that would perform equally as well, and again the present invention is not limited to a particular IC. The receiver IC contains an RF demodulator for demodulating a received RF modulated signal, and can determine the modulation frequency of the RF signal. Referring to FIG. 3, jumpers J1 and J2 connect to an existing hub or base station known in the prior art, and the actual description is omitted herein as one skilled in the art can readily understand the connections. Pin 16 of IC U1 is connected to antenna ANT. Pin 5 and 6 of IC U1 are connected to +5 v supplied from regulator integrated circuit IC1. IC1 receives a +12 v supply voltage from hub 120 and converts the +12 v to a +5 v supply for the RF receiver. Pin 4 of IC U1 is connected the system ground GND of hub 120. Pin 8 of IC U1 is the data output. Data output is connected to IC3A and IC3B. These inverting stages allow for the data out on pin 2 of jumper J2 to be either inverted or non-inverted data depending on the particular system requirements. The inverting stages also allow LED D1 to be selected for either inverted or non-inverted data indication. Capacitor C4 is used to decouple RF signals from IC3. LED D2 driven by IC3F gives a indication of power (+5 v) status. Transistors SJ1 and SJ2 are used to control LED D1 and PPM_UDD on pin 1 of jumper J2. PPM_UDD signals hub 120 that information has been received at the RF receiving unit.

A description of the operation of the RF proximity detection and identification system utilizing RF modulation will now be described with reference to FIGS. 1, 2 and 3. Television 110 begins to transmit an audio ID code for a station that the television 110 is tuned to. The audio ID code is received at PPM 111, 112 and 113. Upon receipt of the ID code, each PPM 111, 112 and 113 stores the ID code and a time stamp. A control signal is sent to the RF transmitter through jumper J1 to command the RF transmitter to begin transmitting its unique RF signal. Each RF transmitter modulates at its preset RF modulation frequency. The modulated RF signal is then transmitted through antenna ANT of FIG. 2 at a preset power level. Since the hub 120 is outside of the preset transmission range of PPM 113, the modulated RF signal from PPM 113 would not be received at hub 120 and therefore RF signal information would not be sent to Arbitron.

A modulated RF signal from PPM 111 and 112 would be received by RF receiving unit of FIG. 3 contained in hub 120. The modulated RF signals from PPM 111 and 112 are received at antenna ANT of FIG. 3. The received RF signals are input into IC U1 where the modulation frequency of each received RF signal is determined and output at pin 8 of IC U1 of FIG. 3. The data is output to pin 2 DATA_OUT of jumper J2. A control signal is output on pin 1 of jumper J2. If the RF receiver is contained within the base station, the RF information is sent to the hub 120 for transmission to Arbitron via the modem. If the RF receiver is contained within the hub 120 itself, the RF information is then sent to Arbitron via the modem. The expression "base unit" is used herein to describe the device in which the RF receiver is located, and can be the home base station or the household hub.

The system according to the present invention is designed such that the RF transmitter could be placed in the household hub or base station (instead of the PPM) with the receiver in the PPM (instead of the hub or base station). The premise that this system works on is the establishment of an RF communications link, no matter which component transmits or receives.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. An audience measurement system comprising a radio frequency (RF) proximity detection and identification system, comprising:
    a plurality of portable people meters (PPM), each comprising an RF transmitter, wherein each of the PPM's receives a control signal, modulates an RF signal to a preset modulation frequency upon receipt of the control signal, and wirelessly transmits the modulated signal via the respective RF transmitter, wherein each of the RF signals are modulated with a respectively different modulation frequency; and
    an RF receiver that monitors a proximity of each PPM using the wirelessly transmitted modulated signals actually received from respective PPM's, determining the modulation frequency thereof, and transmitting the modulation frequency to a remote location for processing user identification and audience measurement based on the monitored proximity of each PPM.

2. The RF proximity detection and identification system of claim 1, wherein a transmission power of each RF transmitter is preset to transmit the modulated signal within a predetermined range.

3. An audience measurement system having a plurality of portable people meters (PPM's) and a base unit, the system containing a radio frequency (RF) proximity detection and identification system, comprising:
    RF transmitters respectively located in each PPM, wherein each RF transmitter is operative for receiving a control signal, modulating an RF signal to a preset modulation frequency in response to the control signal, and wirelessly transmitting the modulated signal, each of the RF transmitters being operative to modulate the RF signal with a respectively different modulation frequency; and
    an RF receiver located in the base unit that monitors a proximity of each PPM using the wirelessly transmitted modulated signal actually received by the RF receiver, determining the modulation frequency thereof, and transmitting the modulation frequency to a remote location for processing user identification and audience measurement based on the monitored proximity of each PPM.

4. The system of claim 3, wherein the transmission power of each RF transmitter is preset to transmit the modulated signal within a predetermined range.

5. The system of claim 4, wherein each RF transmitter further comprises an RF modulator for receiving the control signal and outputting an RF signal modulated to its respectively different modulation frequency.

6. The system of claim 4, wherein the RF receiver further comprises an RF demodulator unit for receiving each wirelessly transmitted RF modulated signal, demodulating each received signal, and determining the modulation frequency of the each received signal.

7. A radio frequency (RF) proximity detection and identification method for use in an audience measurement system comprising the steps of:
 in each of a plurality of portable people meters, modulating an RF signal to a preset modulation frequency upon receipt of a control signal to produce a respective modulated signal, the preset modulation frequency being different for each of the plurality of portable people meters;
 wirelessly transmitting each respective modulated signal from a transmitter of a corresponding portable people meter;
 monitoring the proximity of each portable people meter to an RF receiver based on each wirelessly transmitted modulated signal actually received in the RF receiver;
 determining the modulation frequency of each received signal; and
 transmitting each determined modulation frequency to a remote location for processing user identification and audience measurement based on the monitored proximity of each portable people meter.

8. The RF proximity detection and identification method of claim 7, wherein a transmission power of the transmission of the each modulated signal is preset to transmit within a predetermined range.

9. An audience measurement system having a plurality of portable people meters (PPM's), the system containing a radio frequency (RF) proximity detection and identification system, the RF proximity detection and identification system comprising:
 an RF transmitter unit contained in each of the plurality of PPM's, the RF transmitter unit comprising an RF modulation unit for receiving a control signal and modulating an RF signal to a preset modulation frequency to produce a respective modulated signal, the preset modulation frequency being different for each of the PPM's, wherein the RF transmitter transmits the respective modulated signal as an RF modulated signal;
 a receiver for monitoring respective proximities of each of the plurality of PPM's based on each the transmitted respective modulated signal actually received in the receiver; and
 an RF demodulator unit for demodulating each received modulated signal, and determining the modulating frequency of each the signal, wherein the receiver transmits each determined modulation frequency to a remote location for processing user identification and audience measurement based on the monitored proximity of each PPM.

10. The RF proximity detection and identification system of claim 9, wherein the modulating frequencies are transmitted to a remote location for further processing.

11. The RF proximity detection and identification system of claim 10, wherein a transmission power of each the transmitter is preset to transmit the modulated signal within a predetermined range.

\* \* \* \* \*